US008921511B2

(12) United States Patent
Mallon

(10) Patent No.: US 8,921,511 B2
(45) Date of Patent: *Dec. 30, 2014

(54) PROCESS FOR FORMING AN ARAMID COPOLYMER

(75) Inventor: Frederick K Mallon, Midlothian, VA (US)

(73) Assignee: E I du Pont de Nemours and Company, Wilmington, DE (US)

(*) Notice: Subject to any disclaimer, the term of this patent is extended or adjusted under 35 U.S.C. 154(b) by 115 days.

This patent is subject to a terminal disclaimer.

(21) Appl. No.: 13/559,655

(22) Filed: Jul. 27, 2012

(65) Prior Publication Data

US 2014/0031477 A1 Jan. 30, 2014

(51) Int. Cl.
| | |
|---|---|
| C08G 73/00 | (2006.01) |
| C08G 69/28 | (2006.01) |
| C08G 73/18 | (2006.01) |
| C08G 69/32 | (2006.01) |
| C08G 69/00 | (2006.01) |
| C08G 69/26 | (2006.01) |

(52) U.S. Cl.
CPC ............... *C08G 69/00* (2013.01); *C08G 69/28* (2013.01); *C08G 73/18* (2013.01); *C08G 69/32* (2013.01); *C08G 69/265* (2013.01)
USPC .......................................... 528/422; 528/371

(58) Field of Classification Search
USPC .......................................... 524/422; 528/371
See application file for complete search history.

(56) References Cited

U.S. PATENT DOCUMENTS

| | | | |
|---|---|---|---|
| 3,063,966 A | 11/1962 | Du Pont | |
| 3,227,793 A | 1/1966 | Cipriani | |
| 3,414,645 A | 12/1968 | Morgan | |
| 3,600,350 A | 8/1971 | Kwolek | |
| 3,767,756 A | 10/1973 | Blades | |
| 4,018,735 A | 4/1977 | Nakagawa et al. | |
| 4,172,983 A | 10/1979 | MacLennan | |
| 5,474,842 A | 12/1995 | Hoiness | |
| 5,646,234 A | 7/1997 | Jung et al. | |
| 5,667,743 A | 9/1997 | Tai et al. | |
| 5,811,042 A | 9/1998 | Hoiness | |
| 2010/0029159 A1* | 2/2010 | Ishihara et al. | ............... 442/301 |
| 2011/0046340 A1* | 2/2011 | De Vos et al. | ................. 528/372 |

FOREIGN PATENT DOCUMENTS

| | | |
|---|---|---|
| RU | 2017866 | 8/1994 |
| RU | 2045586 | 10/1995 |
| RU | 2285761 | 10/2006 |
| WO | WO2005054337 | 6/2005 |
| WO | WO2012097236 | 7/2012 |
| WO | WO2013019568 | 2/2013 |
| WO | WO2013019572 | 2/2013 |

OTHER PUBLICATIONS

U.S. Appl. No. 13/559,698, filed Jul. 27, 2012, DuPont.
U.S. Appl. No. 13/559,696, filed Jul. 27, 2012, DuPont.
U.S. Appl. No. 13/559,691, filed Jul. 27, 2012, DuPont.
U.S. Appl. No. 13/559,678, filed Jul. 27, 2012, DuPont.
U.S. Appl. No. 13/559,684, filed Jul. 27, 2012, DuPont.
U.S. Appl. No. 13/559,681, filed Jul. 27, 2012, DuPont.
U.S. Appl. No. 13/559,674, filed Jul. 27, 2012, DuPont.
U.S. Appl. No. 13/559,669, filed Jul. 27, 2012, DuPont.
U.S. Appl. No. 13/559,667, filed Jul. 27, 2012, DuPont.
U.S. Appl. No. 13/559,661, filed Jul. 27, 2012, DuPont.
U.S. Appl. No. 13/559,659, filed Jul. 27, 2012, DuPont.
U.S. Appl. No. 13/559,657, filed Jul. 27, 2012, DuPont.
PCT International Search Report and Written opinion for International Application No. PCT/US2012/048614 Dated May 7, 2013.

* cited by examiner

*Primary Examiner* — Shane Fang

(57) ABSTRACT

The invention concerns processes for forming polymer crumb comprising residues of 2-(4-amino phenyl)-5 (6) amino benzimidazole (DAPBI), paraphenylene diamine (PPD), and terephthaloyl dichloride (TCl), comprising the steps of: i) forming a slurry of b mole percent DAPBI in a solvent system comprising organic solvent and c weight percent of an inorganic salt, wherein the inorganic salt is present in an amount of at least 5 weight present of the organic solvent; ii) contacting the slurry with a less than stoichiometric amount of terephthaloyl chloride to form an prepolymer solution; and iii) contacting the prepolymer solution with y mole percent of PPD and additional TCL to form a polymer solution; wherein the total amount of TCL added in steps ii) and iii) is a stoichiometric amount based on the total amount of DAPBI and PPD added in steps i) and iii); the DAPBI and PPD are added in an amount sufficient for providing a polymer solution having a weight percent solids of 12 percent or greater on a polymer basis; and wherein the sum of y+b is 100 and the product of b×c is 225 or greater.

20 Claims, No Drawings

PROCESS FOR FORMING AN ARAMID COPOLYMER

TECHNICAL FIELD

The present application concerns methods of producing aramid polymers derived from 5(6)-amino-2-(p-aminophenyl)benzimidazole (DAPBI), para-phenylenediamine (PPD) and terephthaloyl dichloride (TCl) that are capable of forming fibers having superior physical properties.

BACKGROUND

Fibers derived from 5(6)-amino-2-(p-aminophenyl)benzimidazole (DAPBI), para-phenylenediamine (PPD) and terephthaloyl dichloride (TCl, also commonly referred to as terephthaloyl chloride) are known in the art. Such copolymers are the basis for a high strength fibers manufactured in Russia, for example, under the trade names Armos® and Rusar®. See, Russian Patent Application No. 2,045,586. U.S. Pat. No. 4,172,938 discloses a process for making aramid polymer that utilizes a solvent containing at least 1.5 but less than 5 weight percent $CaCl_2$ in N-methyl-2-pyrrolidone (NMP).

Present technology does not permit producing DAPBI-containing aramid polymers in a high solids content reaction while achieving polymer having high inherent viscosity. Such a process would be desirable.

SUMMARY

In some aspects, the invention concerns processes for forming polymer crumb comprising residues of 2-(4-amino phenyl)-5 (6) amino benzimidazole (DAPBI), paraphenylene diamine (PPD), and terephthaloyl dichloride (TCl), comprising the steps of: i) forming a slurry of b mole percent DAPBI in a solvent system comprising organic solvent and c weight percent of an inorganic salt, wherein the inorganic salt is present in an amount of at least 5 weight percent of the organic solvent; ii) contacting the slurry with a less than stoichiometric amount of terephthaloyl chloride, based on the amount of DAPBI in step i), to form an prepolymer solution; and iii) contacting the prepolymer solution with y mole percent of PPD and additional TCL to form a polymer solution; wherein the total amount of TCL added in steps ii) and iii) is a stoichiometric amount based on the total amount of DAPBI and PPD added in steps i) and iii); wherein the DAPBI and PPD is added in an amount sufficient for providing a polymer solution having a weight percent solids of 12 percent or greater on a polymer basis; and wherein the sum of y+b is 100 and the product of b×c is 225 or greater. In some embodiments, b×c is 300 or 350 or greater.

In other aspects, the invention relates to a polymer comprising residues of 2-(4-amino phenyl)-5 (6) amino benzimidazole (DAPBI), paraphenylene diamine (PPD), and terephthaloyl dichloride (TCl) made by the processes of the invention described herein. The polymer may be in such forms as a polymer crumb or polymer powder. In one embodiment, a polymer and/or polymer crumb is made by a process comprising the steps of i) forming a slurry of b mole percent DAPBI in a solvent system comprising organic solvent and c weight percent of an inorganic salt, wherein the inorganic salt is present in an amount of at least 5 weight percent of the organic solvent; ii) contacting the slurry with a less than stoichiometric amount of terephthaloyl chloride, based on the amount of DAPBI in step i), to form an prepolymer solution; and iii) contacting the prepolymer solution with y mole percent of PPD and additional TCL to form a polymer solution; wherein the total amount of TCL added in steps ii) and iii) is a stoichiometric amount based on the total amount of DAPBI and PPD added in steps i) and iii); wherein the DAPBI and PPD is added in an amount sufficient for providing a polymer solution having a weight percent solids of 12 percent or greater on a polymer basis; and wherein the sum of y+b is 100 and the product of b×c is 225 or greater. In some embodiments, b×c is 300 or 350 or greater. In other embodiments, the DAPBI and PPD are present in a molar ratio in the range of from 0.25 to 4. In yet other embodiments, the polymer produced has an inherent viscosity of 4 dl/g or greater. In some preferred embodiments, the polymer has an inherent viscosity of 4 to 8 dl/g; in some embodiments the polymer has an inherent viscosity of 6 dl/g or greater.

The use of higher amounts of inorganic salt (such as $CaCl_2$) has led to a surprising increase in inherent viscosity (at higher solids). This higher inherent viscosity is of utility when producing high molecular weight materials such as fibers. Furthermore, the higher solids content of the polymerization solution reduces costs of manufacture as compared with lower solids reactions.

In some embodiments, there is more than one addition of terephthaloyl dichloride in step ii). In some embodiments there are three additions. In some reactions, before and/or after each addition of terephthaloyl dichloride in step ii), the slurry or prepolymer solution is cooled to a temperature of 20 ° C. or below, or 15° C. or below. In certain preferred embodiments, all of the steps are performed under agitation. In some processes, no more than 10 percent of the terephthaloyl dichloride is added in any single addition up to the gel point. The final addition of terephthaloyl dichloride can be done as a single amount so as to allow mixing prior to gelation In certain embodiments, the prepolymer solution in step iii) is also cooled to a temperature of 20° C. or below, or 15° C. or below, prior to contacting the slurry with terephthaloyl dichloride. It can be similarly cooled after the addition.

In some embodiments, the organic solvent is N-methyl-2-pyrrolidone (NMP) or dimethylacetamide (DMAC). Suitable inorganic salts include LiCl and $CaCl_2$. In some embodiments, the solvent has an inorganic salt weight percent in the range of from 5.0 to 10%.

The polymer can be isolated from the solution (that is, the polymerizing solvent) in some embodiments. The polymer can be further treated with one or more washing steps, neutralizing steps, or both. In some embodiments, the polymer can be comminuted. The washing and/or neutralizing steps can be performed before or after comminuting the polymer.

In some aspects, the invention additionally concerns the step of dissolving the polymer in a solvent comprising sulfuric acid to form a solution suitable for spinning fibers. The polymer to be dissolved includes the isolated polymer that may, or may not have been, washed and/or neutralized and the polymer may or may not have been comminuted.

In some embodiments, the total amount of DAPBI and PPD used in the polymer are present in a molar ratio in the range of from 0.25 to 4. For certain processes, the amount of DAPBI use to form the slurry in step i) is in the range of from 2 to 9 weight percent. For certain processes, the amount of PPD used to form the polymer solution in step iii) is from 0.8 to 6.0 weight percent.

The processes of the invention can be run at high solids content. In some embodiments, the weight percent solids in the polymer solution is 12-15% on a polymer basis.

In some processes, the weight percent solids in the polymer solution is 14-25% on a monomer basis. In some embodiments, the weight percent solids in the polymer solution is 14-19% on a monomer basis.

DETAILED DESCRIPTION OF ILLUSTRATIVE EMBODIMENTS

In some aspects, the concerns processes for forming polymer crumb comprising residues of 2-(4-amino phenyl)-5 (6) amino benzimidazole (DAPBI), paraphenylene diamine (PPD), and terephthaloyl dichloride (TCl), comprising the steps of: i) forming a slurry of b mole percent DAPBI in a solvent system comprising organic solvent and c weight percent of an inorganic salt, wherein the inorganic salt is present in an amount of at least 5 weight present of the organic solvent; ii) contacting the slurry with a less than stoichiometric amount of terephthaloyl chloride, based on the amount of DAPBI in step i), to form an prepolymer solution; and iii) contacting the prepolymer solution with y mole percent of PPD and additional TCl to form a polymer solution; wherein the total amount of TCl added in steps ii) and iii) is a stoichiometric amount based on the total amount of DAPBI added in step i) and PPD added in step iii); the DAPBI and PPD is added in an amount sufficient for providing a polymer solution having a weight percent solids of 12 percent or greater on a polymer basis; and wherein the sum of y+b is 100 and the product of b×c is 225 or greater. This stepwise process provides a process for making a polymer by reacting a first diamine (DAPBI) with TCl without competition from a second diamine, at least initially in the polymerization. The oligomer solution that is formed is then allowed to react with the second diamine(PPD) and additional TCl. If both diamines (DAPBI & PPD) were simply combined with the TCl initially, they would uncontrollably compete with each other during the reaction.

Vessels useful for producing polymers, and temperatures and other conditions useful in producing polymers, include, for example, details disclosed in such patents as U.S. Pat. No. 3,063,966 to Kwolek et al.; U.S. Pat. No. 3,600,350 to Kwolek; U.S. Pat. No. 4,018,735 to Nakagawa et al.; U.S. Pat. No. 5,646,234 to Jung et al.; U.S. Pat. No. 4,172,938 to Mera; and WO2005054337 to Bos.

The solvent system has an inorganic salt content of at least 5 weight percent, based on the combination of solvent and salt. In some embodiments, it is believed the inorganic salt content can be as high as 12 weight percent. In some preferred embodiments the inorganic salt content is no more than 10 weight percent and in some most preferred embodiments the content is no more than 8 weight percent. Preferred organic solvents include N-methyl-2-pyrrolidone (NMP), dimethylacetamide (DMAC), or mixtures thereof. Preferred inorganic salts include LiCl, $CaCl_2$ and mixtures thereof.

In one preferred embodiment, the solvent system is NMP/$CaCl_2$. In certain embodiments, the NMP/$CaCl_2$ solvent has a $CaCl_2$ weight percent in the range of from 5 to 10%; in some embodiments the range is 5 to 8 weight %. It should be noted that the solubility of $CaCl_2$ in NMP is about 8%. As such when more than 8% $CaCl_2$ is used, some undissolved $CaCl_2$ is present in the solvent system. The solvents and salts can be obtained from commercial sources and, if desired, purified by methods known to those skilled in the art.

In some processes, the molar ratio of DAPBI to PPD is in the range of from 0.25 to 4.0. This ratio is equivalent to a DAPBI/PPD ratio of 20/80 to 80/20. In certain processes, the amount of the slurry that is DAPBI in step (i) is in the range of from 2.0 to 9 weight percent of the slurry.

In some embodiments, the polymer crumb is made by copolymerizing a prepolymer solution containing oligomers formed from b mole % DAPBI and less than a stoichiometric amount of TCl with y mole % PPD and additional TCl in a mixture of organic solvent containing c weight percent of inorganic salt. In preferred embodiments, the sole amine monomers used in the polymerization are PPD and DAPBI. In some embodiments other amine monomers can be present; however, PPD and DAPBI are present in such embodiments such that y+b equals 100, based on the relative amounts of PPD and DAPBI used. The product of b×c is 225 or greater. In some embodiments, the product of b×c is 300 or greater and preferably 350 or greater.

In some embodiments, the weight percent solids in the product solution is 12-15% on a polymer basis. The term "solids" is well known in the art to refer to the polymer in the product/polymer solution. By "polymer basis" it is meant the weight of the polymer divided by the weight of the total solution of polymer and solvent (and reaction byproducts), expressed as a percentage. By "monomer basis" it is meant the sum of the weights of the individual monomers divided by the weight of the total solution of polymer and solvent (and any reaction byproducts), expressed as a percentage. In some processes, the weight percent solids in the product solution is 14-25% on a monomer basis. In some embodiments, the weight percent solids in the product solution is 14-19% on a monomer basis.

In some embodiments, one or more, or all of the process steps can be performed under agitation.

The polymer can be isolated from the solvent, and in some embodiments the invention concerns a polymer powder comprising residues of 2-(4-amino phenyl)-5 (6) amino benzimidazole (DAPBI), paraphenylene diamine, and terephthaloyl dichloride. In some embodiments, the polymer powder has an inherent viscosity of 4 dl/g or greater. In some preferred embodiments, the polymer has an inherent viscosity of 4 to 8 dl/g; in some embodiments the polymer has an inherent viscosity of 6 dl/g or greater.

The isolated polymer can be comminuted to a desired particle size to assist in processing and storage. The polymer can be treated with one or more washing steps, neutralizing steps, or both. These washing and/or neutralizing steps can be performed before or after comminuting the polymer. Equipment suitable for use in agitation of the reaction mixtures, washing and neutralization steps, and comminuting the polymer is known to those skilled in the art.

Molecular weights of polymers are typically monitored by, and correlated to, one or more dilute solution viscosity measurements. Accordingly, dilute solution measurements of the relative viscosity ("$V_{rel}$" or "$\eta_{rel}$" or "$n_{rel}$") and inherent viscosity ("$V_{inh}$" or "$\eta_{inh}$" or "$n_{inh}$") are typically used for monitoring polymer molecular weight. The relative and inherent viscosities of dilute polymer solutions are related according to the expression $$V_{inh} = \ln(V_{rel})/C,$$

where ln is the natural logarithm function and C is the concentration of the polymer solution. $V_{rel}$ is a unitless ratio, thus $V_{inh}$ is expressed in units of inverse concentration, typically as deciliters per gram ("dl/g").

Neutralization of the polymer can occur in one or more steps by contacting the polymer with a base. Suitable bases include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution of base.

The polymer can also be washed with water independent of or prior to and/or after the neutralization step.

In some aspects, the invention additionally concerns the step of dissolving the polymer in a solvent comprising sulfuric acid to form a solution suitable for spinning fibers (also referred to as a "spin dope"). The polymer to be dissolved includes the isolated polymer that may or may not have been washed and/or neutralized and the polymer may or may not have been comminuted. While any suitable solvent can be used to dissolve the polymer, in some embodiments the solvent comprises N-methyl-2-pyrrolidone (NMP) or dimethylacetamide (DMAC) and an inorganic salt to form a solution suitable for spinning fibers. The dissolved polymer can be spun into fibers by conventional techniques known to those skilled in the art.

The spin dope containing the copolymer described herein can be spun into dope filaments using any number of processes; however, wet spinning and "air-gap" spinning are the best known. The general arrangement of the spinnerets and baths for these spinning processes is well known in the art, with the figures in U.S. Pat. Nos. 3,227,793; 3,414,645; 3,767,756; and 5,667,743 being illustrative of such spinning processes for high strength polymers. In "air-gap" spinning the spinneret typically extrudes the fiber first into a gas, such as air, prior to being coagulated in a aqueous bath. This is a preferred method for forming filaments and sulfuric acid is the preferred spin solvent for this process.

As used herein, the terms filaments and fibers are used interchangeably.

The fiber can be contacted with one or more washing baths or cabinets. Washes can be accomplished by immersing the fiber into a bath or by spraying the fiber with the aqueous solution. Washing cabinets typically comprise an enclosed cabinet containing one or more rolls that the yarn travels around a number of times, and across, prior to exiting the cabinet. As the yarn travels around the roll, it is sprayed with a washing fluid. The washing fluid is continuously collected in the bottom of the cabinet and drained therefrom.

The temperature of the washing fluid(s) is preferably greater than 30° C. The washing fluid can also be applied in vapor form (steam), but is more conveniently used in liquid form. Preferably, a number of washing baths or cabinets are used. The residence time of the yarn in any one washing bath or cabinet will depend on the desired concentration of residual sulfur in the yarn. In a continuous process, the duration of the entire washing process in the preferred multiple washing bath(s) and/or cabinet(s) is preferably no greater than about 10 minutes, more preferably greater than about 5 seconds. In some embodiments the duration of the entire washing process is 20 seconds or more; in some embodiments the entire washing is accomplished in 400 seconds or less. In a batch process, the duration of the entire washing process can be on the order of hours, as much as 12 to 24 hours or more.

If needed, the acidic spin solvent can be removed from the fiber by in a bath or a cabinet. For example, neutralization of the acid (such as sulfuric acid solvent) in the yarn by a base can occur in a bath or a cabinet. In some embodiments, the neutralization bath or cabinet can follow one or more washing other baths or cabinets. Washes can be accomplished by immersing the fiber into a bath or by spraying the fiber with the aqueous solution. Neutralization can occur in one bath or cabinet or in multiple baths or cabinets. In some embodiments, preferred bases for the neutralization of sulfuric acid impurity include NaOH; KOH; $Na_2CO_3$; $NaHCO_3$; $NH_4OH$; $Ca(OH)_2$; $K_2CO_3$; $KHCO_3$; or trialkylamines, preferably tributylamine; other amines; or mixtures thereof. In one embodiment, the base is water soluble. In some preferred examples the neutralization solution is an aqueous solution containing 0.01 to 1.25 mols of base per liter, preferably 0.01 to 0.5 mols of base per liter. The amount of cation is also dependent on the time and temperature of exposure to the base and the washing method. In some preferred embodiments, the base is NaOH or $Ca(OH)_2$.

After treating the fiber with base, the process optionally can include the step of contacting the yarn with a washing solution containing water or an acid to remove all or substantially all excess base. This washing solution can be applied in one or more washing baths or cabinets.

After washing and neutralization, the fiber or yarn can be dried in a dryer to remove water and other liquids. One or more dryers can be used. In certain embodiments, the dryer can be an oven that uses heated air to dry the fibers. In other embodiments, heated rolls can be used to heat the fibers. The fiber is heated in the dryer to a temperature of at least about 20° C. but less than about 100° C. until the moisture content of the fiber is 20 weight percent of the fiber or less. In some embodiments the fiber is heated to 85° C. or less. In some embodiments the fiber is heated under those conditions until the moisture content of the fiber is 14 weight percent of the fiber or less. In some embodiments, the fiber is heated at least to about 30° C.; in some embodiments the fiber is heated at least to about 40° C.

The dryer residence time is less than ten minutes and is preferably less than 180 seconds. The dryer can be provided with a nitrogen or other non-reactive atmosphere. The drying step typically is performed at atmospheric pressure. If desired, however, the step can be performed under reduced pressure. In one embodiment, the filaments are dried under a tension of at least 0.1 gpd, preferably a tension of 2 gpd or greater.

Definitions

As used herein, the term "residue" of a chemical species refers to the moiety that is the resulting product of the chemical species in a particular reaction scheme or subsequent formulation or chemical product, regardless of whether the moiety is actually obtained from the chemical species. Thus, a copolymer comprising residues of paraphenylene diamine refers to a copolymer having one or more units of the formula:

Similarly, a copolymer comprising residues of DAPBI contains one or more units of the structure:

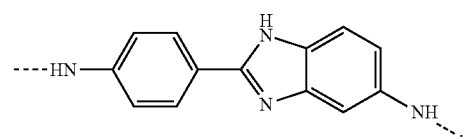

A copolymer having residues of terephthaloyl dichloride contains one or more units of the formula:

The term "polymer," as used herein, means a polymeric compound prepared by polymerizing monomers, whether of the same or a different type. The term "copolymer" (which refers to polymers prepared from two different monomers), the term "terpolymer" (which refers to polymers prepared from three different types of monomers), and the term "quadpolymer (which refers to polymers having four different types of monomers) are included in the definition of polymer.

The term "crumb" means the polymer has breakable clumps or particles that generally have an effective particle diameter of greater than 100 micronmeters, sometimes greater than 1 mm. In some embodiments, crumb further includes coarse powders having an effective particle diameter of 1000 micrometers or less. Effective particle diameter is the diameter of a circle with area equal to that of the projection of the particle on a plane. The term "powder" when referring to polymer means particles of the copolymer having neither fibrous qualities like fiber or pulp, nor fibrous film-like qualities like fibrids. Individual particles tend to be fibril-free, have a random shape, and in some embodiments have an effective particle diameter of 840 micrometers or less. U.S. Pat. Nos. 5,474,842 and 5,811,042 are illustrative.

As used herein, "stoichiometric amount" means the amount of a component theoretically needed to react with all of the reactive groups of a second component. For example, "stoichiometric amount" refers to the moles of terephthaloyl dichloride needed to react with substantially all of the amine groups of the amine components (such as PPD and/or DAPBI) in any one step or in the overall reaction. It is understood by those skilled in the art that the term "stoichiometric amount" refers to a range of amounts that are typically within 10% of the theoretical amount. For example, for the total reaction, the stoichiometric amount of terephthaloyl dichloride used in a polymerization reaction can be 90-110% of the amount of terephthaloyl dichloride theoretically needed to react with total amount of all the amine groups used in the various additions of PPD and DAPBI.

The term "fiber" refers to a relatively flexible, macroscopically homogeneous body having a high ratio of length to width across its cross-sectional area perpendicular to its length.

The term "organic solvent" is understood herein to include a single component organic solvent or a mixture of two or more organic solvents. In some embodiments, the organic solvent is dimethylformamide, dimethylacetamide (DMAC), N-methyl-2-pyrrolidone (NMP), or dimethylsulfoxide. In some preferred embodiments, the organic solvent is N-methyl-2-pyrrolidone or dimethylacetamide.

The term "inorganic salt" refers to a single inorganic salt or to a mixture of two or more inorganic salts. In some embodiments, the inorganic salt is sufficiently soluble in the solvent and liberates an ion of a halogen atom. In some embodiments, the preferred inorganic salt is KCl, $ZnCl_2$, LiCl or $CaCl_2$. In certain preferred embodiments, the inorganic salt is LiCl or $CaCl_2$.

By "never-dried" it is meant the moisture content of the fiber is at least 75 weight percent of the fiber.

As used in the specification including the appended claims, the singular forms "a," "an," and "the" include the plural, and reference to a particular numerical value includes at least that particular value, unless the context clearly dictates otherwise. When a range of values is expressed, another embodiment includes from the one particular value and/or to the other particular value. Similarly, when values are expressed as approximations, by use of the antecedent "about," it will be understood that the particular value forms another embodiment. All ranges are inclusive and combinable. When any variable occurs more than one time in any constituent or in any formula, its definition in each occurrence is independent of its definition at every other occurrence. Combinations of substituents and/or variables are permissible only if such combinations result in stable compounds.

The invention is illustrated by the following examples, which are not intended to be limiting in nature.

Test Methods

Inherent viscosity can be determined using a solution in which a polymer is dissolved in a concentrated sulfuric acid with a concentration of 96 wt % at a polymer concentration (C) of 0.5 g/dl and at a temperature of 25 ° C. Inherent viscosity is then calculated as $\ln(t_{poly}/t_{solv})/C$ where $t_{poly}$ is the drop time for the polymer solution and $L_{solv}$ is the drop time of the pure solvent.

EXAMPLES

NMP, $CaCl_2$, DAPBI, PPD, and TCl were obtained from commercial sources.

Example 1

31.82 kg of NMP Solvent containing 5.38% $CaCl_2$ (a "c" value of 5.38) is charged to a FM130D Littleford Reactor. 2180 g of DAPBI (a "b" value of 70) is then charged. The contents are then cooled to 10° C. 707 g of terephthaloyl chloride is charged to form a prepolymer solution. The prepolymer solution is then cooled to 10 C and 455 g of PPD (an "y" value of 30) is dissolved into the prepolymer mixture. 2122 g of terephthaloyl dichloride is then added. The polymer product of (b×c) equals 377.

Solids in this reaction are 12% on a polymer basis and 14.7% on a total monomer basis. Final inherent viscosity is 6.5 dl/g.

Comparison Example 1

31.82 kg of NMP Solvent containing 2.94% $CaCl_2$ (a "c" value of 2.94) was charged to a FM130D Littleford Reactor. 456 g of PPD (an "y" value of 30) and 2200 g of DAPBI (a "b" value of 70) were then charged. Process was then cooled to 7° C. Three additions of terephthaloyl dichloride were made: 997 g, 997 g, and 855 g. After the first addition, the mixture was cooled to 7 C and after the second the mixture was cooled to 11° C. On conclusion of reaction, the reactor was inspected for deposits, no large chunks of DAPBI were observed on the wall. The product of (b×c) was equal to 206.

Solids in this reaction were 12% on a polymer basis and 14.7% on a total monomer basis. Final inherent viscosity was 3.9 dl/g.

Comparison Example 2

31.82 kg of NMP Solvent containing 3.91% $CaCl_2$ (a "c" value of 3.91) was charged to a FM130D Littleford Reactor. 455 g of PPD (an "y" value of 30) and 2202 g of DAPBI (a "b" value of 70) were then charged. Process was then cooled to 8 ° C. Three additions of terephthaloyl dihloride were made: 997 g, 997 g, and 853 g. After the first addition, the mixture was cooled to 10 C and after the second the mixture was cooled to 12° C. On conclusion of reaction, the reactor was inspected for deposits, no large chunks of DAPBI were observed on the wall. The product of (b×c) was equal to 274.

Solids in this reaction were 12% on a polymer basis and 14.7% on a total monomer basis. Final inherent viscosity was 4.6 dl/g.

Example 2

Example 1 is repeated, however the terephthaloyl dichloride is added to the DAPBI in three additions. After each addition, the mixture is cooled to 10 C. A polymer solution and polymer similar to Example 1 is the result.

Example 3

The polymers of Examples 1 and 2 are individually combined with either (1) a solvent comprising sulfuric acid or (2) a solvent comprising N-methyl-2-pyrrolidone (NMP) or dimethylacetamide (DMAC) and an inorganic salt. The combination is agitated, while cooling if needed to control temperature, until the polymer is fully dissolved in the solvent and a solution suitable for spinning fibers is formed. The polymer solution containing sulfuric acid is extruded through a spinneret and air-gap spun and spun into a coagulation bath that forms filaments that are washed, are dried, and are wound on a bobbin. The polymer solution containing NMP or DMAc is extruded through a spinneret and wet spun in a coagulation bath that forms filaments that are washed, are dried, and are wound on a bobbin.

What is claimed:

1. A process for forming a polymer crumb comprising residues of 2-(4-amino phenyl)-5(6) amino benzimidazole (DAPBI), paraphenylene diamine (PPD) and terephthaloyl chloride (TCL), comprising the steps of:
   i) forming a slurry of b mole percent DAPBI in a solvent system comprising organic solvent and c weight percent of an inorganic salt, wherein the inorganic salt is present in an amount of at least 5 weight percent of the organic solvent;
   ii) contacting the slurry with a less than stoichiometric amount of terephthaloyl chloride, based on the amount of DAPBI in step i), to form an prepolymer solution; and
   iii) contacting the prepolymer solution with y mole percent of PPD and additional TCL to form a polymer solution;
   wherein the total amount of TCL added in steps ii) and iii) is a stoichiometric amount based on the total amount of DAPBI added in step i) and PPD added in step iii);
   wherein the DAPBI and PPD are added in an amount sufficient for providing a polymer solution having a weight percent solids of 12 percent or greater on a polymer basis and a weight percent solids of 14-25% on a monomer basis; and
   wherein the sum of y+b is 100 and the product of b×c is 225 or greater.

2. The process of claim 1, wherein the product of (b×c) is equal to 300 or greater.

3. The process of claim 2, wherein the product of (b×c) is equal to 350 or greater.

4. The process of claim 1 wherein there is more than one addition of terephthaloyl dichloride in step ii).

5. The process of claim 1, wherein the slurry in step i) and/or the solution in step iii) is cooled to a temperature of 20° C. or below prior to contacting said slurry and/or solution with a stoichiometric amount of terephthaloyl dichloride.

6. The process of claim 1 wherein the organic solvent is N-methyl-2-pyrrolidone (NMP) or dimethylacetamide (DMAC).

7. The process of claim 1 wherein the inorganic salt is LiCl or $CaCl_2$.

8. The process of claim 6, wherein the organic solvent is NMP and the inorganic salt is $CaCl_2$.

9. The process of claim 1 wherein the steps are performed under agitation.

10. The process of claim 1, further comprising isolating a polymer from said polymer solution.

11. The process of claim 10, further comprising the step of comminuting the polymer.

12. The process of claim 10, further comprising treating the polymer with one or more washing steps, neutralizing steps, or both.

13. The process of claim 11, further comprising treating the polymer with one or more washing steps, neutralizing steps, or both.

14. The process of claim 12, further comprising the step of drying and then dissolving the polymer in a solvent comprising sulfuric acid to form a solution suitable for spinning fibers.

15. The process of claim 13, further comprising the step of drying and then dissolving the polymer in a solvent comprising sulfuric acid to form a solution suitable for spinning fibers.

16. The process of claim 1 wherein the DAPBI and PPD are present in a molar ratio in the range of from 0.25 to 4.

17. The process of claim 1 wherein the solvent has an inorganic salt weight percent in the range of from 5.0 to 10%.

18. The process of claim 1 wherein the amount of DAPBI used in forming the slurry in step (i) is in the range of from 2 to 9 weight %.

19. The process of claim 1 comprising 0.8 to 6.0 weight % of paraphenylene diamine in step i).

20. The process of claim 1 wherein the weight percent solids in the polymer solution is 12-15% on a polymer basis.

* * * * *